United States Patent Office 3,374,248
Patented Mar. 19, 1968

3,374,248
PHENYLACETONITRILE OXIMES
Charles D. Mitchell, Willow Street, Pa., assignor to Armstrong Cork Company, Lancaster, Pa.
No Drawing. Filed Aug. 3, 1965, Ser. No. 477,002
1 Claim. (Cl. 260—396)

This invention relates to phenylacetonitrile oximes, and more particularly to such oximes which contain a substituted cyclohexadiene ring.

The phenylacetonitrile oximes of the present invention have the formula

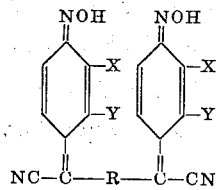

wherein X and Y are selected from the group consisting of

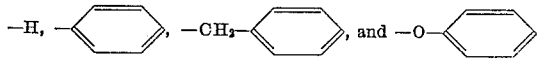

provided at least one of X and Y on any cyclohexadiene group is —H, and R is selected from the group consisting of

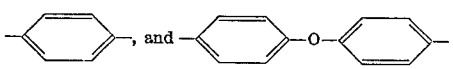

The compounds are useful as ultraviolet light absorbers, particularly when distributed throughout a film of a thromplastic resin such as the polyamides, the polycarbonates, or the acrylates. The phenylacetonitrile oximes of the present invention may be taken up in a suitable inert solvent system which also contains the dissolved polymer. Bottles or other glass containers, or sheets of glass may then be coated in any convenient manner with the solution. On solution evaporation, a stable, ultraviolet light absorbing film will be left on the glass. The compounds also serve an antioxidants in rubber and resinous compositions.

The following examples illustrate several embodiments of the invention.

EXAMPLE 1

Preparation of 1,4-bis(α-4-oxo-2,5-cyclohexadiene-Δ$^{1,α}$-acetonitrile oxime) benzene Into a 500 ml. three-necked flask, fitted with stirrer, reflux condenser, and thermometer were placed 25 g. (0.385 mole) of potassium hydroxide (assay 86.3%) and 50 ml. of absolute methanol. The mixture was stirred until the potassium hydroxide had dissolved, then cooled to room temperature. The addition of 5.47 g. (0.035 mole) of powdered 1,4-bis(cyanomethyl) benzene in one portion (last traces washed in with 25 ml. absolute methanol) gave first a green, then a purple suspension. The suspension was warmed to promote solution, the heat source removed, and 7.76 g. (0.063 mole) of nitrobenzene was added in one portion. The mixture became a clear deep red solution, and the temperature rapidly rose to 70° C. The solution was cooled to 25° and stirred slowly. Within 20 minutes a deep red solid precipitated. After stirring six hours at room temperature, 250 ml. of water was added with vigorous stirring. The mixture was filtered. Acidification of the deep red filtrate gave a very finely divided red solid. The solid was collected by filtration, washed with methanol-water, then ether and dried in a vacuum desiccator. The yield of oxime was 10.8 g. (94%). Four recrystallizations from pyridine gave brick-red crystals of the pure oxime.

Analysis.—Calc'd for $C_{22}H_{14}O_2N_4$: C, 72.12; H, 3.85; N, 15.29. Found: C, 72.05; H, 4.04; N, 15.01.

EXAMPLE 2

Preparation of 1,4-bis(α-3-phenoxy-4-oxo-2,5-cyclohexadiene-Δ$^{1,α}$-acetonitrile oxime) benzene To a filtered solution of 25 g. (0.39 mole) of potassium hydroxide (assay 86.3%) in 50 ml. of absolute methanol contained in a 500 ml. four-necked flask, fitted with stirrer, reflux condenser, thermometer and dropping funnel, was added 5.31 g. (0.03 mole) of 1,4-bis (cyanomethyl) benzene through a powder funnel in one portion. To the resulting purple suspension was added dropwise 14.63 g. (0.068 mole) of o-nitrophenyl phenyl ether during five minutes while stirring. The temperature was kept below 25° with an ice bath during the addition and for a brief time thereafter. A deep red solid soon precipitated. After stirring for a total of 3½ hours at room temperature, the reaction mixture was dissolved in 250 ml. of water and 350 ml. of methanol. Filtration and acidification of the deep red filtrate gave a voluminous red solid which was collected by filtration. The crude oxime weighs more than theoretically possible, apparently because of strong hydration.

EXAMPLE 3

Preparation of 1,4-bis(α-3-phenyl-4-oxo-2,5-cyclohexadiene-Δ$^{1,α}$-acetonitrile oxime) benzene To a filtered solution of 25 g. of potassium hydroxide in 50 ml. of absolute methanol contained in a 500 ml. four-necked flask, fitted with reflux condenser, dropping funnel, thermometer and stirrer, was added 5.0 g. (0.032 mole) of 1,4-bis(cyanomethyl) benzene (recrystallized from $H_2O$) in one portion. To the resulting green-blue suspension was added dropwise 12.75 g. (0.064 mole) of 2-nitrobiphenyl dissolved in 15 ml. of dioxane while stirring and cooling. The reaction temperature was kept below 25° C. with an ice bath during the initial exothermic reaction (30 min.). After stirring five hours at room temperature, the reaction mixture was dissolved in 150 ml. of water and 500 ml. of methanol. Acidification of the deep red solution with dilute acetic acid while cooling and stirring gave a more than quantitative yield of crude red oxime. The extra weight is due to water of hydration. The oxime cannot be recrystallized from benzene, glacial acetic acid, pyridine or ethylene chloride.

EXAMPLE 4

Preparation of 1,4-bis(α-4-oxo-2,5-cyclohexadiene-Δ$^{1,α}$-acetonitrile oxime) diphenyl ether Into a 300 ml. three-necked flask, fitted with stirrer, reflux condenser, thermometer and dropping funnel was placed a filtered solution of 25 g. of potassium hydroxide dissolved in 50 ml. of absolute methanol. Finely powdered 4,4'-dicyanomethyl diphenyl oxide (7.9 g., 0.032 mole) was added in one portion followed by the dropwise addition of 7.9 g. (0.064 mole) of nitrobenzene during five minutes. The reaction temperature was kept below 50° with an ice bath during the initial exothermic reaction. After stirring five hours at room temperature, 150 ml. of water was added with cooling and vigorous stirring. Acidification of the deep red solution with dilute acetic acid gave a quantative yield of crude yellow oxime. Its structure is confirmed by its infrared spectrum which shows strong broad hydroxyl absorption at 3.00μ, moderate highly conjugated nitrile absorption at 4.52μ and a strong absorption peak characteristic of all the quinoid oximes prepared at 9.90μ.

In similar manner, the following oximes were prepared as unpurified crudes. Infrared spectra were used to confirm their structure.

1,4-bis(α-3-phenoxy-4-oxo-2,5-cyclohexadiene-Δ$^{1,α}$-acetonitrile oxime) diphenyl ether
1,4-bis(α-2-phenoxy-4-oxo-2,5-cyclohexadiene-Δ$^{1,α}$-acetonitrile oxime) diphenyl oxide
1,4-bis(α-3-benzyl-4-oxo-2,5-cyclohexadiene-Δ$^{1,α}$-acetonitrile oxime) diphenyl ether
1,4-bis(α-3-phenyl-4-oxo-2,5-cyclohexadiene-Δ$^{1,α}$-acetonitrile oxime) diphenyl ether
1,4-bis(α-2-phenoxy-4-oxo-2,5-cyclohexadiene-Δ$^{1,α}$-acetonitrile oxime) benzene
1,4-bis(α-3-benzyl-4-oxo-2,5-cyclohexadiene-Δ$^{1,α}$-acetonitrile oxime) benzene

I claim:
1. Phenylacetonitrile oximes of the formula

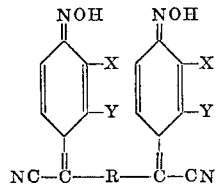

wherein X and Y are selected from the group consisting of

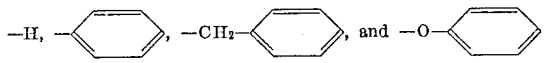

provided at least one of X and Y on any cyclohexadiene group is —H, and R is selected from the group consisting of

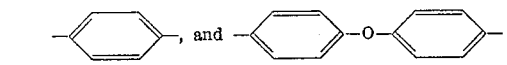

References Cited
UNITED STATES PATENTS
3,156,704  11/1964  Davis _____ 260—396

LORRAINE A. WEINBERGER, *Primary Examiner.*
L. A. THAXTON, *Assistant Examiner.*